United States Patent [19]

York

[11] 4,347,834

[45] Sep. 7, 1982

[54] VARIABLE ENTROPY SOLAR ENERGY HARVESTER

[76] Inventor: Bernard H. York, 1725 Wayne St., Pomona, Calif. 91767

[21] Appl. No.: 211,372

[22] Filed: Nov. 28, 1980

[51] Int. Cl.³ ................................................ F24J 3/02
[52] U.S. Cl. .................................. 126/424; 126/438; 126/451
[58] Field of Search ............... 126/417, 450, 424, 425, 126/438, 439, 451

[56] References Cited

U.S. PATENT DOCUMENTS

| | | | |
|---|---|---|---|
| 1,421,506 | 7/1922 | Limpert | 126/438 |
| 2,770,229 | 11/1956 | Tarcici | 126/451 |
| 2,791,214 | 5/1957 | Poliansky | 126/451 |
| 2,859,745 | 11/1958 | Von Brudersdorff | 126/451 |
| 3,797,476 | 3/1974 | Tarcici | 126/451 |
| 3,964,464 | 6/1976 | Hockman | 126/439 |
| 4,084,581 | 4/1978 | Vigoureux | 126/438 |
| 4,111,184 | 9/1978 | Fletcher et al. | 126/451 |
| 4,112,917 | 9/1978 | Lang | 126/451 |
| 4,138,994 | 2/1979 | Shipley | 126/438 |
| 4,193,389 | 3/1980 | Ku | 126/451 |
| 4,256,088 | 3/1981 | Vindum | 126/438 |

*Primary Examiner*—Daniel J. O'Connor
*Attorney, Agent, or Firm*—Doris Drucker

[57] ABSTRACT

A collector of solar energy has, in cross-section, the profile of a nested, truncated and inverted trough which is formed as an array of concentric annular conic frusta. The array ascends from a base, defined by the outermost frustum, to a vertex defined by the innermost frustum. The collector is disposed intermediate the Sun and an absorber of solar energy. The collector is operatively connected with Sun-tracking means for movement in a predetermined direction and through a predetermined distance relative to the center of the remote absorber. The frusta have reflective inner surfaces, each of which is defined by a singular and unique parabola. Light incident upon the surfaces is transmitted by a single reflection, through the openings at the base of the trough, onto a common focus located at the absorber for the optimal concentration of the collected radiation which may be utilized as thermal energy or converted into other useful forms of energy.

13 Claims, 4 Drawing Figures

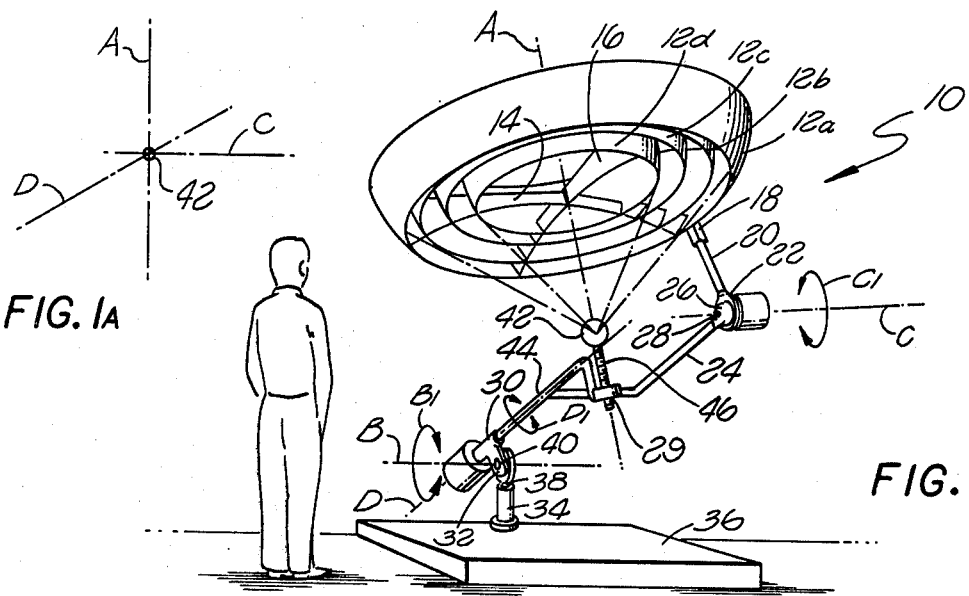
FIG. 1A
FIG. 1
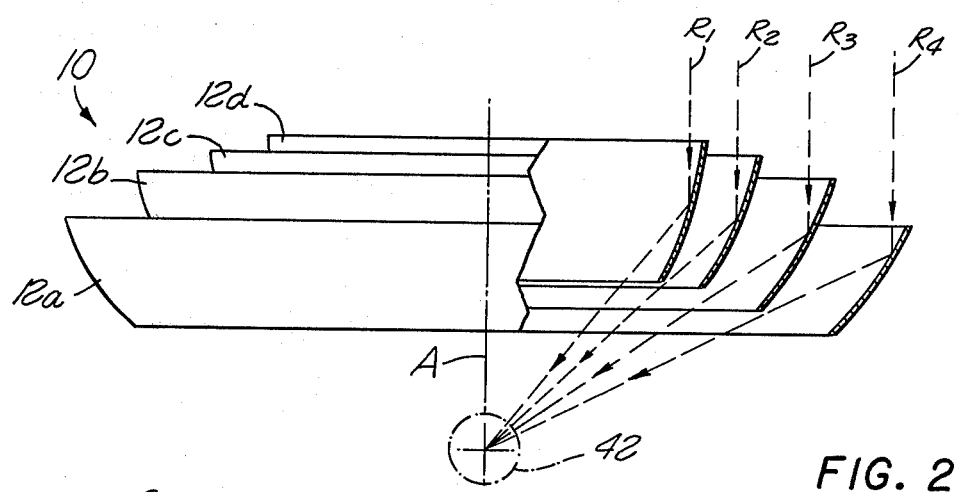
FIG. 2
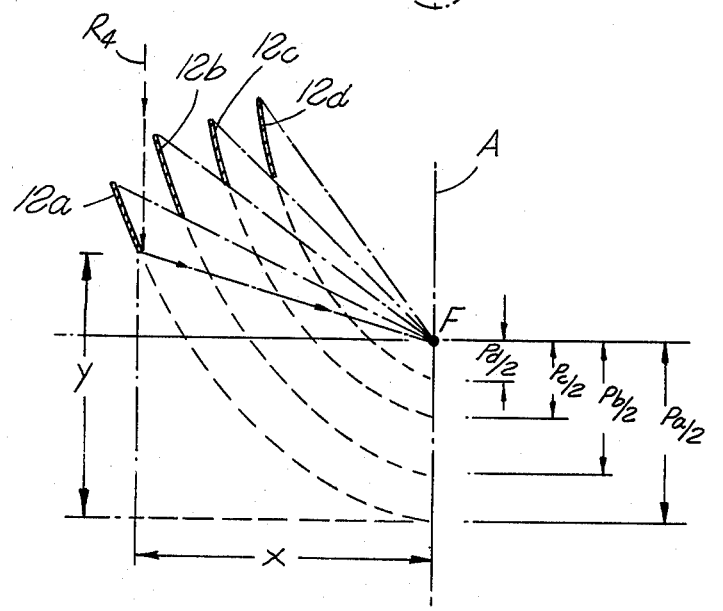
FIG. 3

VARIABLE ENTROPY SOLAR ENERGY HARVESTER

FIELD OF THE INVENTION

The field of art to which the invention pertains includes the field of solar energy collection means adjustably supported for the purpose of maintaining the solar radiation at a given relationship with the collection means as the Sun makes it apparent daily track about the earth, said collection means having surfaces being so shaped and spaced along an optical axis that they are capable of reflecting solar rays onto a radiation absorbing surface remote from the collection means.

References of interest include U.S. Pat. Nos. 3,058,394, 3,982,527, 3,977,773, 4,079,724, 4,011,857, as well as "Applied Solar Energy," by Meinel and Meinel, Addison-Wesley Publishing Co., 1976, "Non-tracking Concentrating Collectors Utilizing Grazing Incidence Mirrors," a paper presented by J. E. O'Meara et al. during the 1957 Conference of the International Solar Energy Society in Los Angeles, and "Reduced Drag, Paraboloid Type, Solar Energy Collectors," a paper presented by P. J. Vermeulen et al. during the 1976 Conference of the International Solar Energy Society in Winipeg, Canada.

BACKGROUND AND SUMMARY OF THE INVENTION

The intensity of solar radiation which is fairly low at ground level can be increased significantly by paraboloid collectors which concentrate the Sun's rays upon a small "point focus" target area. If the collectors are combined with Sun-tracking devices which follow the Sun across the sky along its daily and seasonally changing path, the concentration of insolation at the target can result in temperatures which exceed by a wide margin the 300° to 400° F. minimum that is required for most of the process industries in the United States. It has been calculated that a carefully designed tracking and concentrating device can produce temperatures up to 7000° F. and above which can be used for a wide range of applications, e.g., to drive turbine generators for producing electricity, to drive photovoltaic or thermionic-thermo-electric generators of electricity, for metallurgical melting, for alloying, or high-temperature fuel-producing chemical processes such as the release of hydrogen from water.

Stationary as well as tracking prior art devices for the conversion of solar into thermal energy through paraboloid collectors generally consist of one or more cusps with reflective surface areas which reflect incident light upon a focal zone that may be located intermediate the collector and the Sun (front focus), or behind the collector (linear rear focus). In a rear focus device the collector includes an opening for each cusp for the transmission of the reflected light upon the focal zone. The concentration of energy, that is the "equilibrium temperature" at the focal zone depends upon the size and geometry of the collector-concentrator components as well as on heat loss due to re-radiation to the environment which is engendered during the energy-conversion process. Technical data commonly available enable a direct correlation of the designed concentration factor and the resultant "equilibrium temperature." To reduce wind drag it has been proposed to build a collector from conical frusta which are juxtaposed but spaced apart a sufficient distance to permit air flow through the structure.

Front focus collectors have numerous drawbacks, such as the relative inaccessibility of the focal zone which hampers the utility of the devices. The absorber, thus of necessity, must be mounted on the collector structure, where it adds weight to the tracking articulation and requires reinforcement and stiffening of the support structure. Considerations of weight as well as of shading effects limit the amount of focal zone insulation that can be used. As a result, as much as 45% of the collected energy is reportedly lost to the environment. A further disadvantage is the need for frequent alignments of the collector relative to the absorber when both move through a semi-circular tracking arc.

Prior art single-reflection rear-focus devices concentrate the insolation on a linear focus, which means a dilution of the energy yield. Such devices deliver only a fraction of the harvest which can be obtained in point focus devices. An increase in their efficiency involves an increase in the size of the components which presents structural problems as well as higher costs for material and manufacturing. The more massive the expanse, the greater the wind drag and the problems associated with it. Multiple-reflection rear-focus devices, though they can produce a "point" focus, also make substantial demands on material and construction capability; the concentration of the insolation on a "point" requires large surface areas from which the rays are reflected several times before they hit the target.

The problems are aggravated in devices which track the Sun, because the movement of heavy and voluminous bodies is expensive in terms of energy and precision engineering. The drawback of stationary, that is, non-tracking devices is that only parts of the collector surface are accessible to incident light for the greater part of the day. The reception of sunlight is near zero at sunrise, increases to a full value at high noon and tapers off again to near zero at sunset. Thus, a non-tracking collector-concentrator absorbs only some 60% of the otherwise available insolation. Further, such devices are commonly tilted toward the equator, and during some five months of the year (36° N. latitude) are self-shading near sunrise and sunset, thus, losing some 23% of the annular daylight hours.

The present invention intends to overcome the limitations of prior art described heretofore by providing an efficient single-reflection rear-focus tracking solar collector which produces a "point" focal image on a concentrator-absorber which is fixed in relation to the collector. The entire structure is compact and lightweight and occupies a minimum of space.

Accordingly, a rear-focus parabolic collector of solar energy is disclosed which is formed as an array of nested annular conic frusta that are in stepped relation to one another, and symmetrically disposed about a focal axis passing through their geometric centers. The array which is mounted on a support frame, has the profile of an inverted, truncated annular trough that is open at both ends, and which ascends from a base, defined by the outermost frustum, to a vertex defined by the innermost frustum. Each frustum has an outer surface, and an inner surface which is defined by a singular and unique parabola. The surfaces are inclined in an upwardly and outwardly slanting direction relative to the common focal axis of the parabolas. Thus, the upper rims of the various frusta have a larger perimeter than the lower rims.

The area circumscribed by the lower rim of the innermost frustum at the top of the array is substantially larger than the area required to transmit rays reflected from the innermost frustum to the focus at the rear of the collector. The ratio of the largest diameter of the outermost frustum to that of the smallest of the innermost frustum is about 5:2, so that the open area represents a loss of some 16% in available collection surface. Although this subtraction appears as a sacrifice of a portion of the fill-factor, it is fully compensated for by the configuration of the present invention as will be shown hereinafter. In fact, the dimensions of the open area are an essential item in the functional efficiency of the device. The collector which includes a frame for connecting the frusta to each other, is interposed between the Sun and an absorber. The absorber is mounted on the support frame distal from the collector. The distance between the collector and the absorber can be adjusted by moving the latter along the focal axis toward, or away from, the collector.

Sun-tracking means operatively connected with the collector frame for continuous movement of the collector and the absorber which is stationary relative to the collector, constantly align the focal axis with the Sun as it moves across the sky. The Sun-tracking means which are part of the combination comprising the present invention, may include mechanical, hydraulic, electric and electronic components such as are well-known in the art.

Although the collector-absorber is operable with two frusta, spaced apart to provide an annular air gap which reduces the wind drag, a preferred embodiment comprises a larger number of frusta with intermediate air gaps.

The frusta, made of lightweight material, have a reflective inner surface which may be formed of deposits such as polished foil, or a glossy dielectric coating such as white paint, or aluminized film attached to the frusta structure; alternately the base of the frusta may be a sheet material such as pure aluminium which can be buffed or otherwise treated by chemical or electrical polishing to obtain the desired brightness.

The attitude of the reflective surfaces toward the Sun is such that the incident angle for solar radiation at any point is greater than 45° and preferably 60° or greater. The magnitude of the incidence angle is related to the reflectivity of the dielectric surface option in that there is a marked increase in reflection when the incident light comes in at 60° (Daniels, Farrington: "Direct Use of the Sun's Energy," Yale University Press, 1964). Such high reflection justifies the use of the term "gloss lens" for the device. "Gloss" of opaque materials, according to a test method of the American Standard for Testing Materials, is measured by a reflection angle—corresponding to an incidence angle—greater than 45°, and "lens" includes any device for the concentration (or dispersion) of radiation.

The collection efficiency of the Sun-tracking collector-absorber of the present invention resides in the combination of several factors: the favorable angles of incidence and reflection which permit the convergence of the rays onto a very narrow focal zone, the overall geometry which compensates for the loss of fill-factor collector surface areas; the compactness of structure and design, and the accessibility of the absorber which is rotatably synchronized along the focal axis by the Sun-tracking mode of operation of the collector, and which is stationary relative to the collector and remote therefrom at its rear.

Seen from above, the collector represents a continuous, uninterrupted annular surface area circumscribing the noncollecting central portion, whereas an elevational view shows the assembly as a spaced-apart, staggered configuration of parabolic frusta. In the plane normal to the focal axis the focal zone consists of a multiplicity of very tight overlapping ellipses—each derived from one reflection spot—which approach a "point" and represent the maximum concentration of the reflected radiation. The greater the concentration the higher the temperature at the focus which can be utilized through conventional heat transfer or conversion means for a multitude of purposes.

Another factor which contributes to the efficiency of the solar energy conversion is the spacing of the frusta relative to one another as well as to the focal axis. The slightly vertical clearance between proximate frusta prevents areas of shading, so that light incident upon any surface portion is transmitted by single reflection onto the absorber without the energy loss inherent in multiple reflections.

A further advantage is that the center of focus is fixed at a point and does not require gross arcuate large radius translations of the energy absorber such as would be necessary in a Sun-tracking front focus device.

The Sun-tracking operation of the device is automatic and needs only a one-time adjustment at the time of installation to align the concentrator's diurnal axis with the true North (or South), and to position the diurnal axis relative to the horizontal plane, so that it is at an angle which corresponds to the local latitude of the site. This one-time adjustment places the diurnal axis in parallel with the earth's axis.

The compact structure and the light weight of the device constructed in accordance with the present invention are further advantages which make it possible to position it economically in a spatially limited area, either on a pole in the ground or on top of existing buildings. It has been calculated that a four-frusta collector with an overall diameter of some 9 feet, equivalent to the diameter of a backyard picnic table umbrella, can deliver more than the annual heating/cooling requirements of the average household, even if performance penalty and thermal losses are taken into account. The yield can be improved by increasing the collection area of the device as fabricated, and/or by using multiple units.

Still another advantage is that the highest delivered "equilibrium temperatures" on the absorber can be scaled down to provide lower temperatures appropriate for a particular use. This can be done by moving the absorber away from or toward the collector along the focal axis, in order to diffuse the sharp focal image and dilute the concentration on the absorber.

BRIEF DESCRIPTION OF THE DRAWINGS

FIG. 1 is a perspective view of the solar energy collector-concentrator in accordance with the present invention.

FIG. 1A is a schematic isometric view of a detail shown in FIG. 1.

FIG. 2 is a cross sectional view, partly broken away, of a detail shown in FIG. 1.

FIG. 3 is a schematic view of a detail shown in FIG. 1.

DETAILED DESCRIPTION

Referring to FIG. 1, there is shown a solar collector 10 consisting of a concentrically nested array of four conical frusta 12a, 12b, 12c, and 12d which are in stepped relation and separated by air gaps from one another. The frusta are symmetrically disposed about a focal axis A passing through their geometrical centers. The array has the profile of an inverted truncated, annular trough (FIG. 2) which is open at both ends and which ascends from a base, circumscribed by the outermost frustum 12a, to a top circumscribed by the innermost frustum 12d. Each of the frusta has an outer surface, and an inner, reflective, surface which is defined by a singular and unique parabola, and which is inclined in an upwardly and outwardly slanting direction toward the Sun. Thus, the upper rim of each frustum has a larger perimeter than its lower rim. A pair of thin cross-ribs 14 and 16 are attached to the upper rims of the four frusta to connect the units to each other.

The spaced air gaps between the frusta 12a, 12b, 12c, and 12d (FIG. 2), have the dual function of reducing wind drag against the structure, and of transmitting solar rays, incident upon and reflected by, the inner surfaces of the frusta, onto the focal zone located along the axis A. The parabolic surface areas of the frusta, and the intermittent air gaps are calculated to provide, in a plane view, the appearance of a virtually unbroken annular surface, spanned by the ribs 14 and 16, and surrounding a central aperture that is equivalent to the area circumscribed by the lower view of the frustum 12d.

A strut 18, attached at one end of the rib 14 at the outer surface of the frustum 12a is connected at its other end to an arm 20. The opposite end of the arm 20 is affixed to a housing 22 of a declination tracking motor whose rotor 26 is connected, via linkage means 28, to an elongated rod 24. The movement of the rotor 26 about the axis C in the direction of the arrow $C_1$ moves the arm 20 relative to the arm 24. The arm 24 continues into an arm 44 which is received in sleeve bearing 30 that include a perforated bracket 32. A tubular stanchion 34, mounted on a base 36, rotatably houses a shaft 38 which includes at its upper end an opening (not shown). A pin 40, passing through the opening of the shaft 38 and the adjacent perforation of the bracket 32, pivotally connects the sleeve bearing 30 to the stanchion 34. The strut 18, the arm 20, the rods 24 and 44, the sleeve bearings 30, the stanchion 34 and the shaft 38 as well as their linkage means comprise the support structure for the collector 10 as well as the tracking articulation system for continuously following the Sun's virtual motion along two axes as will be described hereinafter.

A solar energy concentrator in the form of an absorber 42 is disposed at the common focal zone of the frusta 12a, 12b, 12c, and 12d. The area of acceptance of the absorber for the reflected solar rays may be a plane or an arcuate surface, neither of which needs to be larger than approximately one inch in diameter for high temperature collection. The absorber is placed a sufficient distance away from the collector structure and the tracking system to avoid deterioration of the latter by the high temperatures developed on the absorber and interference with the mechanism of the system. At the same time, the distance, both from the collector and the tracking system, increases the accessibility of the absorber and facilitates the transfer of energy from it.

The absorber 42, shown as a "bead," is mounted at one end of a shaft 46 which is centered on the axis A and which is threadedly movable, along the axis through a perforation 29 that is provided in the arm 44. The absorber may be positioned relative to the center of focus by advancing or retracting the shaft 46 along the axis A. The location of the center of focus so obtained relative to the absorber 42 remains fixed during daily and seasonal tracking.

The transfer or conversion of the energy concentrated on the absorber is effected by methods well-known in the art. In one embodiment (not shown) the absorber 42 includes a cavity into which a heat transfer fluid is admitted. In another embodiment the absorber is immersed in an absorber tube which is filled with a heat-transfer medium. In yet another embodiment, the thermal energy is converted into electrical energy by photovoltaic cells.

As shown in FIG. 1, the base 36 is disposed on the ground which is taken to be parallel to the horizon at the site. In an alternate embodiment which dispenses with a base, the stanchion 34 may be mounted on flat or sloping roofs or on any variety of existing structures.

The frusta 12a, 12b, 12c, and 12d are made of lightweight material. They may be manufactured separately or as one unit, by casting, molding, vacuum forming, or other conventional manufacturing methods. The assembly is compact and stable and presents no structural load problems. For example, if the frusta are made of 0.016" aluminum, the entire collector stack would weigh only approximately 50 pounds. The upwardly and outwardly facing surfaces of the frusta are made reflective either by integral formation with a reflective metallic dielectric material, or by vacuum or electrostatic deposition of such material, by a dip, a chemical polish or a coating of metallized film, of aluminized paint or similar means. Preferably, the material used in the construction of the collector should be corrosion resistant and impervious to breakage due to wind-driven objects.

The absorber 42, comprising material which has a high melting point such as, for instance, tungsten, may be provided with a dielectric surface coating which allows the reflected solar energy to penetrate. Underneath this may be a layer made of energy absorbent material. It is to be understood, however, that the material components of the absorber are not to be considered part of the present invention but are recited by way of example only.

The dimensions of the collector 10, its elevation and its distance from the focal zone are shown in FIG. 1 by way of comparison next to the drawing of a human figure taken to be 6 foot 2 inches tall. The diameter of the outermost frustum 12a, respectively of the collector 10, is 9.7 feet which is approximately the diameter of a larger-size backyard picnic table umbrella. It is to be understood that this, and other, dimensions of the drawing according to FIG. 1 do not present limitations in size or scale but are shown merely to demonstrate the feasibility of placing the collector-concentrator unobtrusively in a location where it satisfies architectural and aesthetic standards. If the site permits, much larger units may be installed, although additional structural support means would be required.

The Sun-tracking system for the collector-absorber in accordance with the present invention is based on methods and operational components well-known in the art. It includes means for a one-time adjustment of the collector axis A by rotating the shaft 38 in the stanchion 34 to point it to the true North (in the Northern hemisphere) or to the true South (in the Southern hemisphere), as well as means for continuous adjustments to follow the seasonal and diurnal excursions of the Sun. The one-time adjustment task also defines the angle of inclination of the diurnal axis D at the site to become parallel with the earth's rotational axis. It is effected at the time of installation by rotating the bracket 32 about the equatorial-adjusting axis B in the direction of the arrow $B_1$, bringing the sleeve bearing 30, and hence the axis A, to rest at an angle with the horizontal which corresponds numerically to the latitude of the site. Seasonal adjustments are made by changing the attitude of the arm 20 relative to the rod 24. This is accomplished by moving the housing 22 about the axis C in the direction of the arrow $C_1$ to follow the Sun from North to South. The total excursion in six months amounts to 47° which corresponds to a daily change of 0.2574°. Diurnal adjustments are made by moving the rod 24 at constant speed, relative to the sleeve bearing 30, about the axis D in the direction of the arrow $D_1$ to follow the Sun from East to West at the rate of 15° per hour. The total excursion amounts to approximately 180°. The axes A, C, and D which intersect at right angles (FIG. 1A), at the focus on the absorber 42, are offset from one another to permit adequate clearance.

Because absorber 42 is supported on an arm 44 which is centered on the axis D and affixed to the arm 24 at the sleeve bearing 30 the center of the absorber acceptance area is always fixed as adjusted relative to the center of the focal zone.

Drive means for the non-linear motions of the Sun-tracking system may be controlled by a microcircuit computer which instructs an appropriate motor in accordance with solar ephemeris data stored in its clock memory; alternately they may be coupled to a closed-loop system which, upon detection of an error between the position of the Sun and the focal zone initiates corrective movements to compensate for deviations due, for example, to wind conditions or mechanical irregularities (or a combination of the two). The hydraulic, mechanical or electronic components of the tracking system may include Sun sensors, a timing mechanism as well as appropriate circuits for the control and coordination of the various movements as are well-known to one skilled in the art.

The operation of the collector-concentrator in accordance with the present invention is based upon the single reflection of solar rays from the inner parabolic surfaces of the frusta 12a, 12b, 12c, and 12d onto a focal zone which is normal to the focal axis and common to all four frusta. The focal image is formed of a multiplicity of overlapping tight ellipses which is the closest approach to a point that is attainable. Tightness of the ellipse grouping is affected by the fabricated accuracy of the location of each reflective x-y point on the frusta. Even with a precise x-y fabrication accuracy, the location of the center of focus and the size of the focal zone may be affected by a misalignment of the focal axis with the center of the Sun. In this, the location of the center of focus is disturbed more than the focal size because an unwanted decrease in incidence angles on one side of the collector tends to be neutralized by a desired increase in incidence angles on the opposite side. Tracking misalignments of this nature which are caused by manufacturing errors can be overcome by calibrating the collector through adjustment means mounted on the collector itself. Also, the tracking means can be calibrated to deliver perfection in operation. Assuming a reasonably perfect tracking mechanism, the concentration of solar energy is thus a function of the collection area and of the resulting focal zone. The higher the concentration, the greater the amount of useful energy that is harvested from a predetermined collection area exposed to insolation.

In order to enhance the usefulness of the collector-concentrator for the operation of thermionic, magneto-hydrodynamic and other high-temperature devices, it is desirable to produce the highest possible temperature at the absorber, especially since this maximizes the usefulness of the collected energy and because heat lost to the environment in the form of convection or re-radiation must be subtracted from a potentially achievable maximum gain. It has been reported that such heat loss is substantially inversely proportional to the concentration and hence also to the temperature. Lower temperatures such as may be required for domestic purposes and other applications can be produced by diffusing the sharp focal image through a movement of the absorber 42 away from or towards the collector 10 along the axis A. In accordance with the illustration of FIG. 1, this can be done by manipulating the threaded shaft 46 relative to the perforation 29.

The larger focal zone provided for lower temperatures reduces the demands on fabrication accuracy and calibration of the tracking mechanism which are more stringent for the "point" focus required for higher temperatures.

Peak performance in terms of maximum concentration at lowest cost requires the careful coordination of all parameters of the device, such as the x-y dimensions, the height, shape and number of the frusta, their spacing relative to each other and to the absorber, the focal length, and the size of the open area circumscribed by the lower rim of the innermost frustum 12d. For a collector with a diameter of 9.725 ft. a central circular area with a diameter of 3.947 ft. has been determined experimentally and theoretically to be the necessary and best fit. This central circular "hole" with a diameter which is some 40% of the outside diameter of the device, is a requisite for the feasibility of the collector-absorber of the present invention. Without it, it would not be possible to construct an operational device of the necessary size and characteristics.

The deficiency in inner collection surface is overcome by a slight increase in the outside diameter of the collector. The resulting enlargement of the collector restores equality, in terms of collection surface, with prior art type parabolic rear-focus devices, although the latter approaches cannot be compared with the present invention in terms of versatility and efficiency.

FIG. 2 illustrates the arrival of the rays $R_1$, $R_2$, $R_3$, and $R_4$ on the inner surfaces of the frusta 12a, 12b, 12c, and 12d, and their reflection, through the air gaps and the inner empty hole onto the absorber 42 at an incidence—and reflection-angle which lies between 54° and 72°. Consistent with an earlier standard set by the American Standard for Testing Materials for measuring the reflectivity of opaque surfaces, incidence angles in this range produce what is called a "gloss." This definition of high reflective power, especially for dielectric, that is, non-conducting surfaces, justifies the description of the present device as a Gloss Lens, if lens is taken as the definition for any device which concentrates (or disperses) radiation.

The drawing of FIG. 2 is a simplified view in that it shows a parallel arrangement of incoming solar rays. In reality, rays coming from the Sun's edge subtend a half-angle which can be taken to be 0.27°, so that the focal image from each point of the reflected insolation is not a sharp point but a spread-out elliptical area. The radius of deviation $\Delta x$ from a point focus assumes a different value for the reflections from each frustum, with an average of a 0.425 inch radius for a four-frusta collector. The calculation of the deviation $\Delta x$ is based on the fact that the major axis of each elliptical image from each reflection point lies on the common center of focus but is of different length on opposite sides thereof. A conservative estimate of the size of the focal zone may be obtained by averaging the larger segments of all the ellipses' major axes and by calculating the focal area as if it were a circle with a radius represented by the average length of the segments.

In an approximation which represents the surface S which receives the insolation as a plane, and the acceptance area $A_f$ of the reflected rays as a circle, the concentration factor K for the device is given by the equation $$K = \frac{S}{A_f} = \frac{S}{(\Delta X)^2 \pi}$$

For a 9.7 ft. collector with a radius of 58.348 inches and an empty inner area of 23.682 inch radius $$K = \frac{[(58.348)^2 - (23.682)^2]\pi}{(0.425)^2 \pi} = 15.745 \approx 10^{4.2}$$

which corresponds to a temperature of 7052° F. that is well in the solar furnace category. (See V. B. Veinberg, "Optics for the Utilization of Solar Energy," or "Standard Handbook for Mechanical Engineers," 7th ed., McGraw-Hill.)

The parabolas which define the shape of the frusta 12a, 12b, 12c, and 12d (FIG. 3) according to the equation $x^2 = 2py$, where p is the semi-latus rectum, differ from each other by the value of p, so that each point on their surface areas lies on a unique intersection of the x and y axes. This enables the full utilization of the surfaces for the collection of solar energy. As shown in FIG. 3, rays such as $R_4$ which grazingly pass beyond the acceptance surface of the frustum 12b are still caught by the next lower frustum 12a and reflected therefrom onto the focal zone.

The data which specify the parabolic surfaces and other variables, such as the number of frusta or the distance between the collector and the absorber, are obtained by mathematical calculations and may be fed into a computer program for the numerically controlled manufacture of the device. Although an operable collector-absorber can be constructed of two frusta, a four-frusta unit offers the most favorable energy yield in terms of minimal stack height. A decrease in height of individual frustra which is obtainable by units with a greater number of frusta, is offset by an increase in wind drag and the disadvantage of stronger and heavier support structures.

Similarly there is an optimal distance between the collector and the focal zone, respectively the center of the empty "hole" in the plane of the lower rim of the frustum 12a. This may vary depending on the size of the collector for a 9.7 ft. collector, for instance, the predetermined optimal distance is 16 inches.

A 9.7 ft. diameter collector-absorber, as described heretofore, at a location of 36° N and assuming 100% efficiency of the device as well as 100% sunshine can produce an annual energy harvest of approximately 55.5 million BTU, or 150% of the entire energy requirements of a representative household (1975 Statistical Abstract of the United States). A realistic deduction of fifty percent from the potential maximum, due to performance penalties, thermal loss and the availability of sunshine, still leaves a gain of some 27 million BTU which is more than enough to satisfy the heating and cooling requirements of such a household and is the equivalent of some 69 million fossil fuel BTUs. Proportionately larger gains can be obtained from larger units, or an assembly of smaller units at one site.

I claim:

1. A variable entropy solar energy harvester comprising
   an absorber for absorbing the energy of the Sun's rays for conversion into another form of energy;
   a frame distal from said absorber and disposed intermediate said absorber and the Sun;
   means for supporting said frame and said absorber in said relationship;
   Sun-tracking means operatively connected to said frame for movement therefore along two axes corresponding to the diurnal movement of the Sun along the East-West axis and the seasonal movement of the Sun along the North-South axis;
   means for sustaining said absorber in a stationary position relative to said Sun-tracking movements;
   a plurality of annular conic frusta of different diameters concentrically mounted on said frame with respect to an axial line passed through their geometric centers and in a stepped array, ascending from a base formed by the outermost of said frusta to a vertex formed by the innermost of said frusta, said array comprising annular gaps intermediate proximate frusta, said frusta circumscribing a conoid interior cavity, said frame comprising at least one cruciform stay fixedly connecting said frusta to one another across said gaps and said cavity, each of said frusta comprising an outer surface and a light reflecting inner surface of arcuate profile defined by a singular and unique parabola whose focal length is different from but correlated with the focal length of each of the parabolas defining surface areas in said array, each of said frusta being inclined in an upwardly and outwardly slanting direction relative to said axial line for receiving incident solar rays and transmitting them by means of a single reflection through said annular gaps and said interior cavity onto said absorber, said absorber comprising a focal zone common to said light reflecting parabolic frusta and said focal zone having a common center of focus at the intersection of said two axes; and
   means for moving said absorber along said axial line.

2. The variable entropy solar energy harvester as defined in claim 1 wherein said absorber is disposed at a location on an imaginary extension of said axial line, and wherein the area of acceptance for reflected light is at said center of focus on said absorber.

3. The variable entropy solar energy harvester as defined in claim 1 wherein said absorber comprises a flat surface.

4. The variable entropy solar energy harvester as defined in claim 1 wherein said absorber comprises an arcuate surface.

5. The variable entropy solar energy harvester as defined in claim 1 wherein said outer surfaces of said frusta are of convex shape.

6. The variable entropy solar energy harvester as defined in claim 1 wherein said light-reflecting surfaces are integrally formed with said frusta.

7. The variable entropy solar energy harvester as defined in claim 1 wherein said light reflecting surfaces are superposed on said frusta.

8. The variable entropy solar energy harvester as defined in claim 1 comprising a glossy dielectric coating superposed on said light reflecting surfaces.

9. The variable entropy solar energy harvester as defined in claim 1 comprising a plurality of frusta spaced from one another a distance which allows the utilization of the entire inner surface of each frustum for the collection and reflection of incident light.

10. The variable entropy solar energy harvester as defined in claim 1 wherein said profiles of said inner surfaces of said frusta are adapted to accept solar radiation at incidence angles greater than 45°.

11. The variable entropy solar energy harvester as defined in claim 1 comprising at least two frusta.

12. The variable entropy solar energy harvester as defined in claim 1 wherein said frame and said frusta are made of lightweight material.

13. The variable entropy solar energy harvester as defined in claim 1 wherein said means for moving said absorber comprise an externally threaded elongated member fixedly attached to said absorber remote from said frame in co-linear alignment with said axial line, and a flange mounted on said support means comprising an axially aligned internally threaded passage to threadedly engage said elongated member for axial movement of said absorber relative to said frame.

* * * * *